(12) United States Patent
Glugla

(10) Patent No.: US 10,273,927 B2
(45) Date of Patent: Apr. 30, 2019

(54) CONTROLLING VARIABLE COMPRESSION RATIO WITH A PRESSURE-REACTIVE PISTON

(71) Applicant: Ford Global Technologies, LLC, Dearborn, MI (US)

(72) Inventor: Chris Paul Glugla, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 93 days.

(21) Appl. No.: 15/446,902

(22) Filed: Mar. 1, 2017

(65) Prior Publication Data
US 2018/0252197 A1 Sep. 6, 2018

(51) Int. Cl.
| F02B 75/04 | (2006.01) |
|---|---|
| F02P 5/15 | (2006.01) |
| F02B 75/38 | (2006.01) |
| F02P 5/152 | (2006.01) |
| F02D 41/14 | (2006.01) |

(Continued)

(52) U.S. Cl.
CPC .............. *F02P 5/15* (2013.01); *F02B 75/044* (2013.01); *F02B 75/38* (2013.01); *F02D 35/02* (2013.01); *F02D 41/1498* (2013.01); *F02D 41/26* (2013.01); *F02P 5/151* (2013.01); *F02P 5/1522* (2013.01); *F02D 35/027* (2013.01); *F02D 2200/021* (2013.01); *F02D 2200/022* (2013.01); *F02D 2200/023* (2013.01); *Y02T 10/46* (2013.01)

(58) Field of Classification Search
CPC ...... F02B 75/044; F02B 75/045; F02B 75/38; F02D 2200/021; F02D 2200/022; F02D 2200/023; F02P 5/15; F02P 5/151; F02P 5/1502; F02P 5/152; F02P 5/1522; F02P 5/1525

USPC ...... 123/78 B, 78 BA, 78 E, 406.29, 406.34, 123/406.39, 406.55

See application file for complete search history.

(56) References Cited

U.S. PATENT DOCUMENTS

| 4,376,429 A | 3/1983 | Youngblood |
|---|---|---|
| 5,197,431 A | 3/1993 | Takaba et al. |

(Continued)

FOREIGN PATENT DOCUMENTS

| EP | 0848155 A2 | 6/1998 |
|---|---|---|
| EP | 1724457 A1 | 11/2006 |
| WO | 2014057534 A1 | 4/2014 |

OTHER PUBLICATIONS

Miazgowicz, Keith D., et al., "Two-Port Integrated Exhaust Manifold for an Internal Combustion Engine Having Three Cylinders," U.S. Appl. No. 15/069,113, filed Mar. 14, 2016, 50 pages.

(Continued)

*Primary Examiner* — Erick R Solis
(74) *Attorney, Agent, or Firm* — Julia Voutyras; McCoy Russell LLP

(57) ABSTRACT

Methods and systems are provided for adjusting an ignition timing of an internal combustion engine responsive to a biasing force of a pressure-reactive piston. In one example, an engine may include a pressure-reactive piston having a top wall biased away from a piston base by a pressure of gas contained within the base. An ignition timing of a combustion chamber including the piston is adjusted responsive to an estimated biasing force of the gas against the top wall.

17 Claims, 6 Drawing Sheets

(51) Int. Cl.
*F02D 41/26* (2006.01)
*F02D 35/02* (2006.01)

(56) References Cited

U.S. PATENT DOCUMENTS

| | | |
|---|---|---|
| 5,540,202 A | 7/1996 | Cullen et al. |
| 6,318,308 B1 | 11/2001 | Hsu et al. |
| 6,349,698 B2 | 2/2002 | Park |
| 6,553,949 B1* | 4/2003 | Kolmanovsky ....... F02B 75/045 |
| | | 123/406.21 |
| 6,564,769 B2 | 5/2003 | Kolmanovsky et al. |
| 6,732,682 B2* | 5/2004 | Aoyama ................ F01L 1/34 |
| | | 123/406.55 |
| 6,907,849 B2 | 6/2005 | Galvin |
| 6,915,766 B2 | 7/2005 | Aoyama et al. |
| 8,087,390 B2 | 1/2012 | Hiyoshi et al. |
| 8,495,984 B2 | 7/2013 | Riegel et al. |
| 8,646,419 B2* | 2/2014 | Kamiyama ............. F01P 7/14 |
| | | 123/48 A |
| 9,399,969 B2 | 7/2016 | Boyer et al. |
| 9,441,551 B2 | 9/2016 | Boyer et al. |
| 2003/0084875 A1* | 5/2003 | Cullen .................. F02D 15/02 |
| | | 123/406.23 |
| 2004/0025818 A1* | 2/2004 | Baeuerle ................ F02B 57/04 |
| | | 123/78 E |
| 2004/0069254 A1* | 4/2004 | Aoyama ............... F02B 75/045 |
| | | 123/78 E |
| 2004/0074455 A1* | 4/2004 | Roberts, Jr. ............. F02B 41/00 |
| | | 123/41.82 R |
| 2005/0056240 A1* | 3/2005 | Sugiyama ............. F02B 75/045 |
| | | 123/78 E |
| 2007/0227503 A1* | 10/2007 | Hitomi ................ F02D 13/0223 |
| | | 123/406.45 |
| 2012/0222653 A1* | 9/2012 | Kodama ............. F02D 13/0238 |
| | | 123/406.11 |
| 2012/0271533 A1 | 10/2012 | Shishime |
| 2014/0060503 A1 | 3/2014 | Zhu et al. |
| 2016/0032846 A1 | 2/2016 | Boyer et al. |
| 2016/0312693 A1* | 10/2016 | Brevick ................ F02B 75/044 |
| 2016/0333774 A1 | 11/2016 | Boyer et al. |

OTHER PUBLICATIONS

Glugla, Chris Paul, "Method and System for Engine Control," U.S. Appl. No. 15/467,957, filed Mar. 23, 2017, 50 pages.

* cited by examiner

CONTROLLING VARIABLE COMPRESSION RATIO WITH A PRESSURE-REACTIVE PISTON

FIELD

The present description relates generally to methods and systems for controlling ignition timing of an internal combustion engine.

BACKGROUND/SUMMARY

An internal combustion engine includes at least one combustion chamber formed by a cylinder and capped by a cylinder head. A piston disposed within the combustion chamber is moved toward the cylinder head to compress a mixture of fuel (e.g., gasoline) and air in what is known as a compression stroke of a combustion cycle. A spark plug is then energized to ignite the fuel/air mixture and produce an expanding flame front within the combustion chamber. The ignition of the mixture increases a gas pressure within the combustion chamber and forces the piston away from the cylinder head in what is known as a power stroke or expansion stroke of the combustion cycle.

During conditions in which a combustion chamber temperature is excessively high and/or a pressure of gases within the combustion chamber is excessively high (e.g., higher than standard operating temperature/pressure ranges), a portion of the fuel/air mixture may ignite after discharging a spark via the spark plug during a single combustion cycle and outside of the flame front produced by the spark plug in what is commonly referred to as detonation or knock. Knock results in a localized sharp increase in pressure within the combustion chamber at the location of the portion of detonating fuel/air mixture. The increased pressure may result in engine degradation via mechanical erosion of engine components.

Attempts to address increased combustion chamber pressures include utilizing a pressure-reactive piston within the combustion chamber in order to temporarily increase a volume of the combustion chamber in response to pressure increases. One example approach is shown by Galvin in U.S. Pat. No. 6,907,849. Therein, a piston is disclosed incorporating a bellows spring acting between the piston and an associated connecting rod so as to bias the connecting rod away from a crown of the piston. Another example approach is shown by Youngblood in U.S. Pat. No. 4,376,429. Therein, a method is disclosed for individually controlling a spark timing of engine cylinders in order to increase a performance of each cylinder. Cylinder to cylinder variations in operating characteristics and ambient conditions can be taken into account while selecting a cylinder spark timing for increased torque and reduced knock.

However, the inventors herein have recognized potential issues with such systems. As one example, a bellows spring of an engine piston configured to store energy from combustion of an air/fuel mixture within a combustion chamber, such as that disclosed in the '849 patent referenced above, may result in a decreased torque output of the engine due to compression and expansion of the bellows spring occurring at times during the combustion cycle that result in less force transmitted to the crankshaft by the piston. As another example, methods to reduce engine knock by adjusting ignition timing, such as the method disclosed in the '429 patent referenced above, do not account for a behavior of a pressure-reactive piston within an engine combustion chamber. Because a pressure-reactive piston may decrease a compression ratio of the combustion chamber during operating conditions in which a pressure of gases within the combustion chamber is higher, a likelihood of knock may be reduced. Adjusting the ignition timing in response to knock without additionally adjusting in response to operating conditions of the pressure-reactive piston may result in an ignition timing that is too advanced or too retarded, thereby leading to reduced engine efficiency and potential engine degradation.

In one example, the issues described above may be addressed by a method comprising: estimating a biasing force of a pressure-reactive piston disposed within a combustion chamber of an engine; and adjusting an operating parameter of the engine based on the estimated biasing force. In this way, the estimated biasing force of the piston may be utilized by a controller of the engine in order to adjust engine operation and increase engine performance and/or efficiency.

As one example, an ignition timing of the engine may be adjusted in response to the estimated biasing force. The ignition timing may be advanced or retarded responsive to the estimated biasing force in order to reduce knock within a combustion chamber, for example. The piston may include a sealed base containing a compressible gas with the gas exerting the biasing force against a top wall of the crown of the piston. The controller may estimate the biasing force for different engine operating conditions, such as different piston operating temperatures and different octane ratings of fuel injected into the combustion chamber. By adjusting ignition timing based on the estimated biasing force, an amount of work produced by the engine may be increased and a likelihood of knock may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
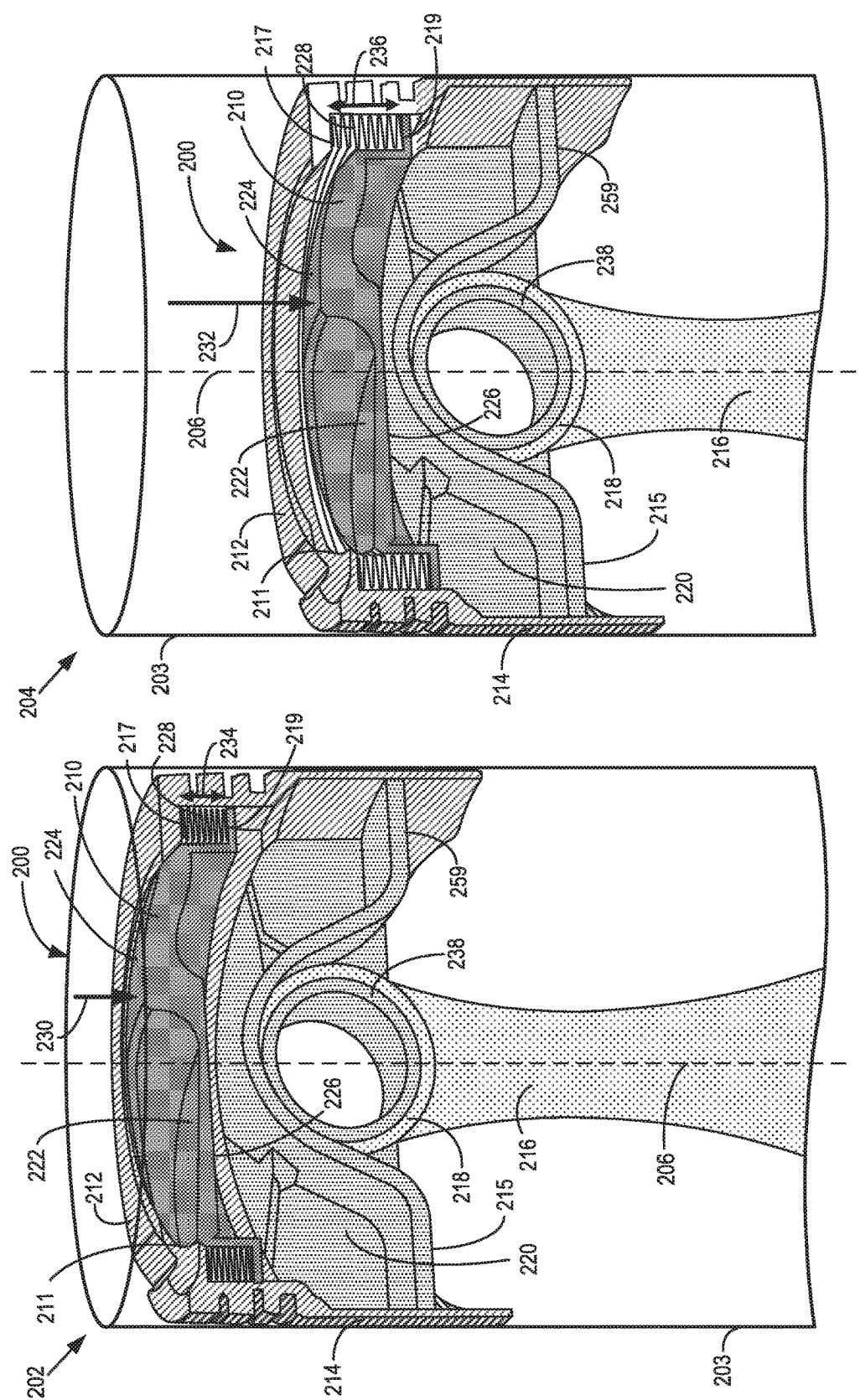
FIG. 2 shows a first view and a second view of a pressure-reactive piston of an engine, with a top wall of the piston in a first position in the first view and the top wall in a second position in the second view.
Figure 3:
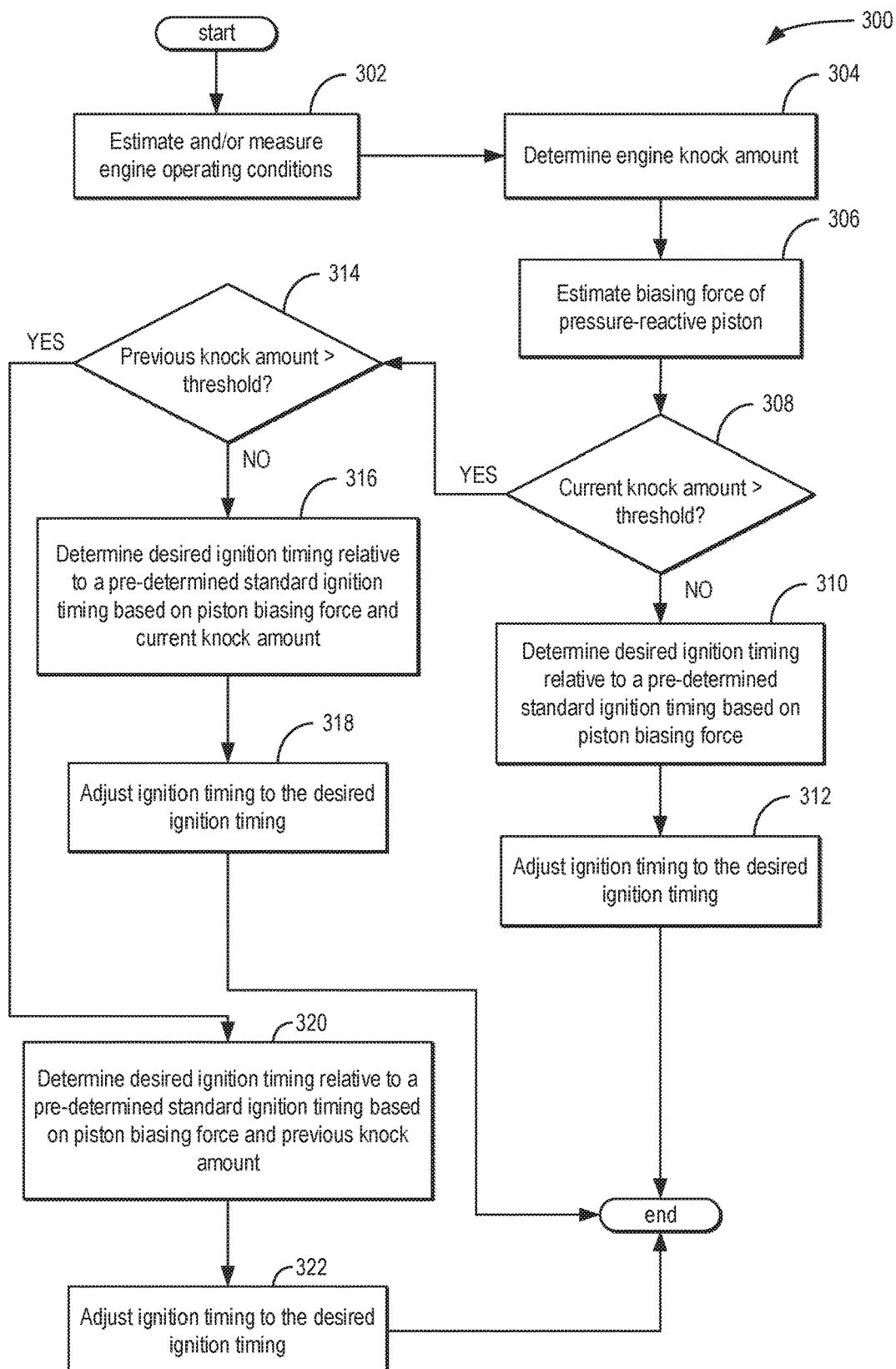
FIG. 3 shows a flow chart of an example method for adjusting an ignition timing of a combustion chamber in response to a biasing force of a pressure-reactive piston disposed within the combustion chamber.
Figure 4:
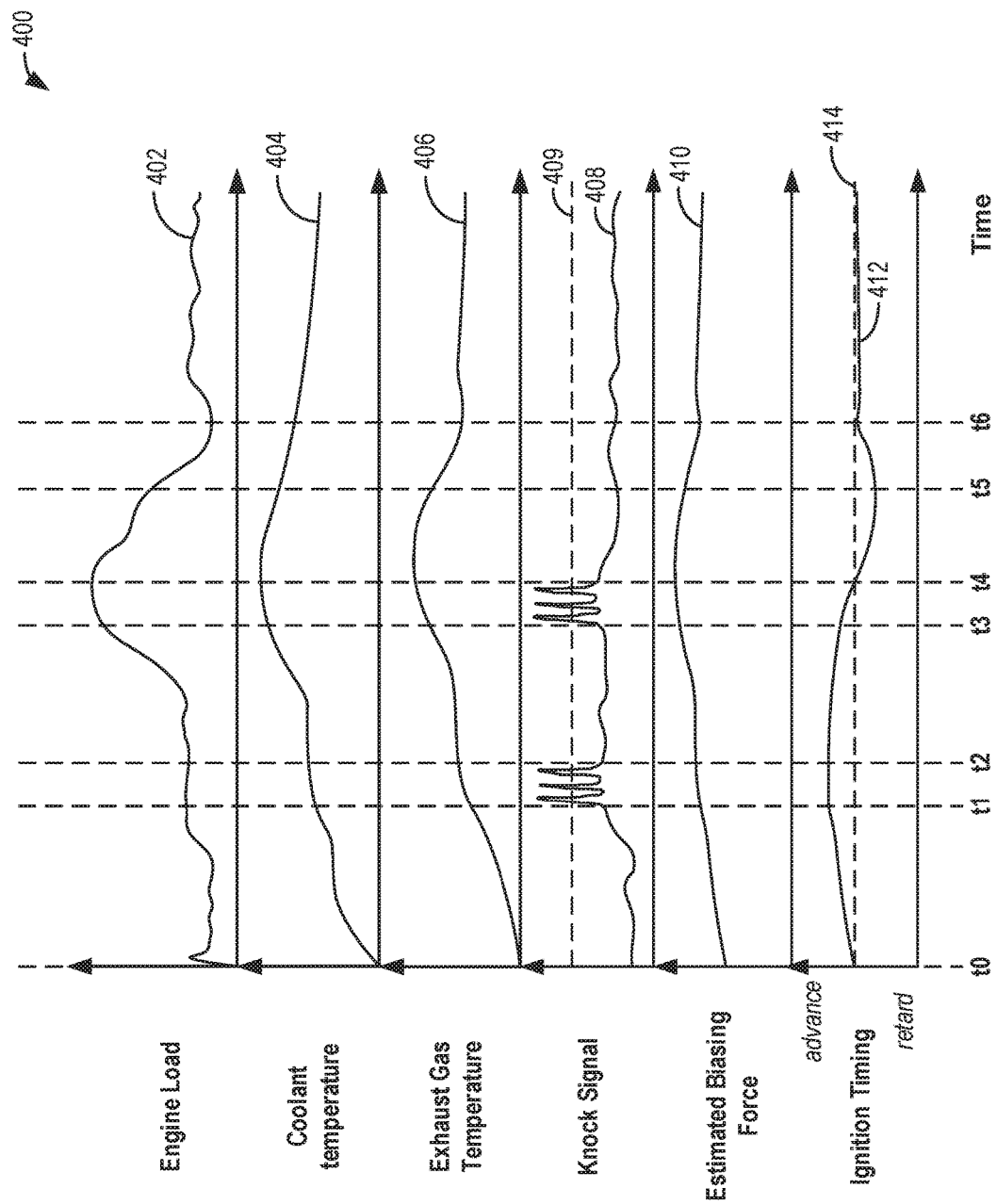
FIG. 4 shows plots illustrating adjustments to ignition timing of a combustion chamber in response to an estimated biasing force of a pressure-reactive piston.
Figure 5:
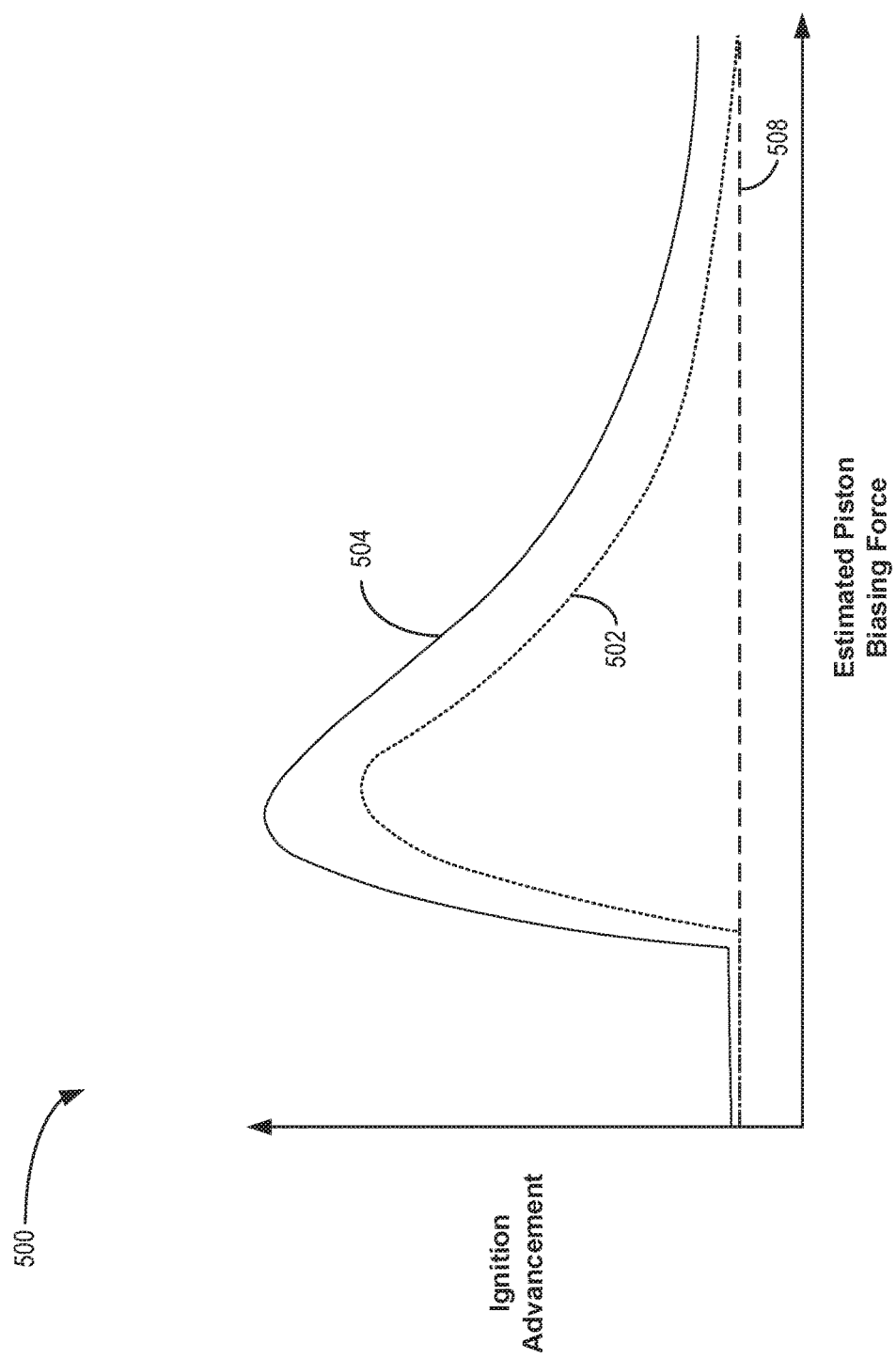
FIG. 5 shows a graph illustrating adjustments to ignition timing of a combustion chamber and an estimated biasing force of a pressure-reactive piston within the combustion chamber for a fuel with a first octane rating and a fuel with a second octane rating.
Figure 6:
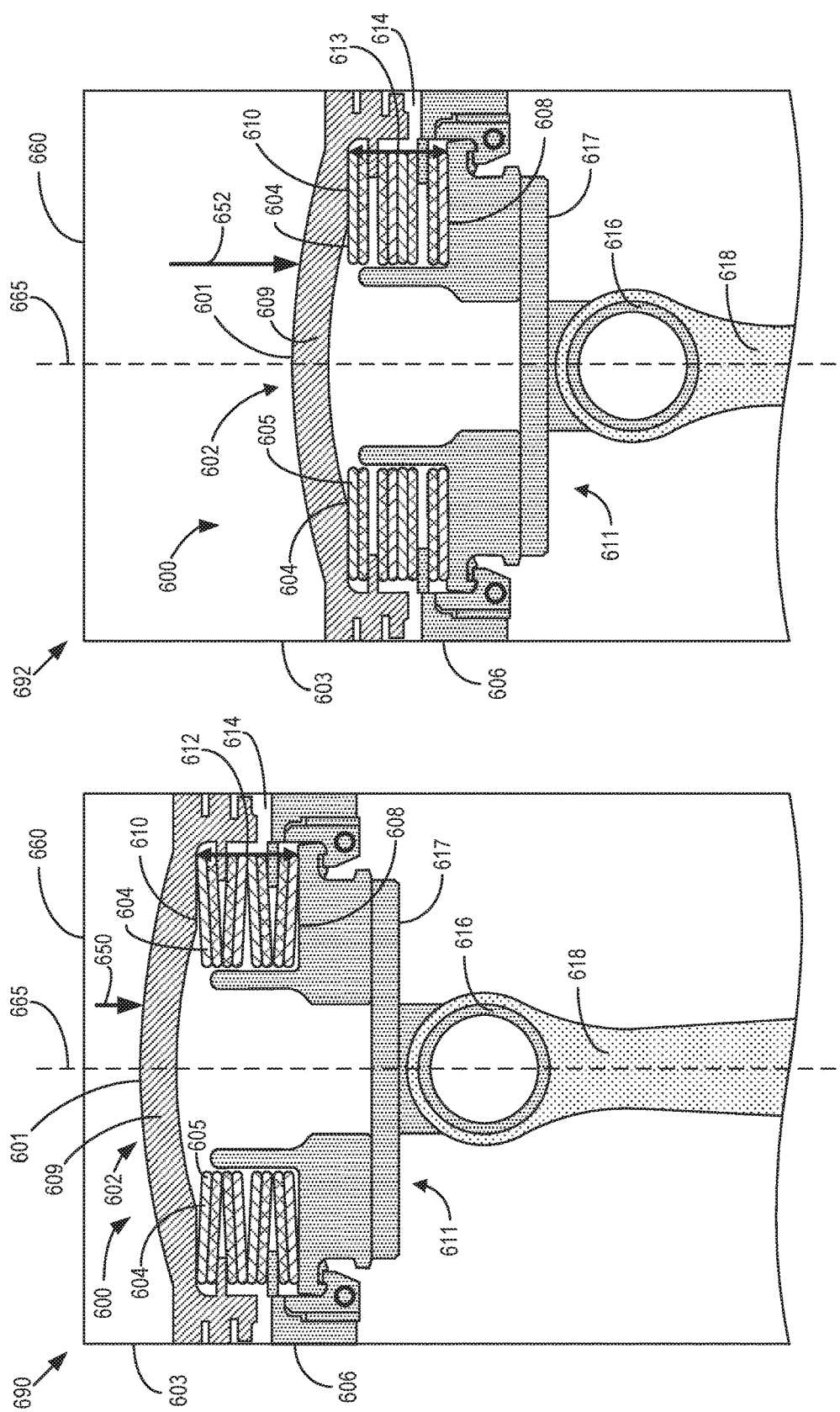
FIG. 6 shows an alternate embodiment of a pressure-reactive piston including a mechanical biasing member.

The following description relates to systems and methods for adjusting operation of an internal combustion engine in response to an estimated biasing force of a pressure-reactive piston. An engine, such as the engine shown by FIG. 1, may include a pressure-reactive piston disposed within a combustion chamber. A crown of the piston may include a moveable top wall biased away from a base of the piston by gas (e.g., air) contained within the base, as shown by FIG. 2. The moveable top wall may be joined with an inner surface of the piston by an expandable bellows. As gas pressure within the combustion chamber increases above a pressure of gas within the base of the piston, the moveable top wall may be pressed away from the crown of the piston and toward the base of the piston, thereby compressing the gas within the base and expanding the bellows. A pressure of gas within the base of the piston against the top wall of the piston (and therefore, a biasing force of the gas against the top wall) may vary with temperature according to the ideal gas law, $PV=nRT$. In one example, as shown by FIG. 3, a controller of the engine may estimate the biasing force in order to adjust an ignition timing of the combustion chamber. In some examples (as shown by FIGS. 3-4), the ignition timing may be adjusted in response to the estimated biasing force and a knock rate of the combustion chamber. In other examples (as shown by FIG. 5), the ignition timing may additionally be adjusted in response to the estimated biasing force and an octane rating of fuel injected into the combustion chamber. In yet other examples, a piston may include a mechanical biasing member, as shown by FIG. 6. A biasing force of the mechanical biasing member is estimated based on a temperature of the mechanical biasing member, and the ignition timing is adjusted based on the estimated biasing force. In this way, the ignition timing is adjusted according to the estimated biasing force in order to increase an amount of work produced by the engine and to reduce a knock rate of the combustion chamber.

Figure 1:
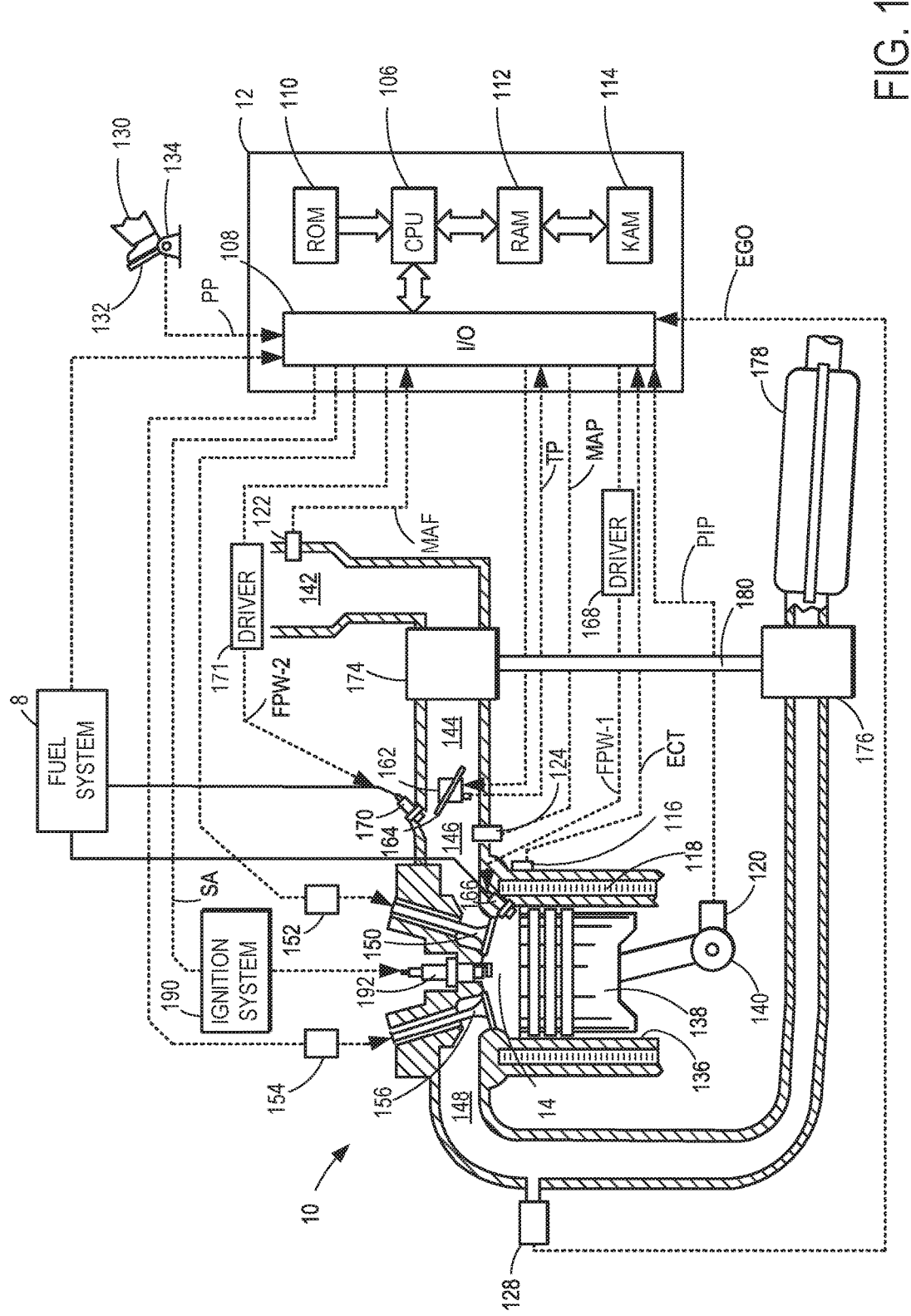
FIG. 1 shows a schematic diagram of an engine cylinder including a pressure-reactive piston.

FIG. 1 depicts an example of a combustion chamber or cylinder of internal combustion engine 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. In the example shown by FIG. 1, the piston 138 is a pressure-reactive piston similar to the example shown by FIG. 2 and described further below. Crankshaft 140 may be coupled to at least one drive wheel of the passenger vehicle via a transmission system. Further, a starter motor (not shown) may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some examples, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be positioned downstream of compressor 174 as shown in FIG. 1, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other examples, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock. Additionally, due to the piston 138 being a pressure-reactive piston, the compression ratio of cylinder 14 may vary according to a pressure of gases within the cylinder 14 and a temperature of the piston 138. For example, a base of the piston 138 may contain a gas (e.g., air), and top surface (e.g., top wall) of the piston may be configured to move relative to the base in response to a difference between a pressure of gas within the base and a pressure of gas within the combustion chamber. During conditions in which the pressure of gas within the combustion chamber exceeds the pressure of gas within the base of the piston (e.g., during a compression stroke of a combustion cycle), the top surface of the piston may be moved (e.g., pressed) from an initial position a direction toward the base of the piston, thereby expanding a volume of the combustion chamber and decreasing the compression ratio. During conditions in which the pressure of the gas within the combustion chamber is less than the pressure of gas within the base of the piston (e.g., during an exhaust stroke of the combustion cycle), the top surface of the piston may move in a direction away from the base of the piston and toward the initial position, thereby reducing a volume of the combustion chamber. An octane rating of fuel injected into the combustion chamber may increase or decrease a movement of the top surface of the piston relative to the base, as described below with reference to FIG. 5.

In some examples, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some examples, each cylinder of engine 10 may be configured with one or more fuel injectors for providing fuel thereto. As a non-limiting example, cylinder 14 is shown including two fuel injectors 166 and 170. Fuel injectors 166 and 170 may be configured to deliver fuel received from fuel system 8. As elaborated with reference to FIGS. 2 and 3, fuel system 8 may include one or more fuel tanks, fuel pumps, and fuel rails. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 positioned to one side of cylinder 14, it may alternatively be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a fuel tank of fuel system 8 via a high pressure fuel pump, and a fuel rail. Further, the fuel tank may have a pressure transducer providing a signal to controller 12.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

In an alternate example, each of fuel injectors 166 and 170 may be configured as direct fuel injectors for injecting fuel directly into cylinder 14. In still another example, each of fuel injectors 166 and 170 may be configured as port fuel injectors for injecting fuel upstream of intake valve 150. In yet other examples, cylinder 14 may include only a single fuel injector that is configured to receive different fuels from the fuel systems in varying relative amounts as a fuel mixture, and is further configured to inject this fuel mixture either directly into the cylinder as a direct fuel injector or upstream of the intake valves as a port fuel injector. As such, it should be appreciated that the fuel systems described herein should not be limited by the particular fuel injector configurations described herein by way of example.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load, knock, and exhaust temperature, such as described herein below. The port injected fuel may be delivered during an open intake valve event, closed intake valve event (e.g., substantially before the intake stroke), as well as during both open and closed intake valve operation. Similarly, directly injected fuel may be delivered during an intake stroke, as well as partly during a previous exhaust stroke, during the intake stroke, and partly during the compression stroke, for example. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof etc. One example of fuels with different heats of vaporization could include gasoline as a first fuel type with a lower heat of vaporization and ethanol as a second fuel type with a greater heat of vaporization. In another example, the engine may use gasoline as a first fuel type and an alcohol containing fuel blend such as E85 (which is approximately 85% ethanol and 15% gasoline) or M85 (which is approximately 85% methanol and 15% gasoline) as a second fuel type. Other feasible substances include water, methanol, a mixture of alcohol and water, a mixture of water and methanol, a mixture of alcohols, etc.

In still another example, both fuels may be alcohol blends with varying alcohol composition wherein the first fuel type may be a gasoline alcohol blend with a lower concentration of alcohol, such as E10 (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities such as a difference in temperature, viscosity, octane number, etc. Moreover, fuel characteristics of one or both fuel tanks may vary frequently, for example, due to day to day variations in tank refilling.

Controller 12 is shown in FIG. 1 as a microcomputer, including microprocessor unit 106, input/output ports 108, an electronic storage medium for executable programs and calibration values shown as non-transitory read only memory chip 110 in this particular example for storing executable instructions, random access memory 112, keep alive memory 114, and a data bus. The controller 12 receives signals from the various sensors of FIG. 1 and employs the various actuators of FIG. 1 to adjust engine operation based on the received signals and instructions stored on a memory of the controller. For example, the controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. The controller may adjust engine operation (e.g., ignition timing) via actuation of spark plug 192, valve actuators 152 and 154, throttle 162, etc. Engine speed signal, RPM, may be generated by controller 12 from signal PIP. Manifold pressure signal MAP from a manifold pressure sensor may be used to provide an indication of vacuum, or pressure, in the intake manifold. Controller 12 may infer an engine temperature (e.g., an operating temperature of the piston) based on an engine coolant temperature.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

FIG. 2 shows an example of a pressure-reactive piston 200 of an engine, similar to the piston 138 shown by FIG. 1 and described above. The piston 200 is shown in cross-section by a first view 202 and a second view 204. First view 202 shows a top wall 210 of the piston in a first position (e.g., initial position) in which a bellows 228 (e.g., bellows gasket) coupled with the top wall 210 is fully compressed, and second view 204 shows the top wall 210 in a second position in which the bellows 228 is partially extended (e.g., expanded).

Piston 200 includes a crown 212, a skirt 214, and a base 215. The crown 212 forms an exterior surface of the piston and a bottom surface of a combustion chamber 203 (e.g., similar to the combustion chamber 14 shown by FIG. 1 and described above) in which the piston is disposed. The crown 212 includes a central aperture 211 (e.g., opening) shaped to surround an outer perimeter of the top wall 210. Top wall 210 is centered within the crown 212 and is moveable in a direction of a central axis 206 of the piston 200. The top wall 210 is coupled to the crown 212 via the bellows 228, and the bellows 228 may expand or contract in order to move the top wall 210 relative to the crown 212 and the base 215, as described further below. Bellows 228 extends between an inner surface 219 of the crown and an extension 217 of the top wall 210. In some examples, bellows 228 may be formed of a flexible material (e.g., an elastomer). In other examples, the bellows 228 may be formed of a metal (e.g., steel). In some examples, a top surface 224 of the top wall 210 may include a bowl 222 depressed from the top surface 224 and shaped to alter (e.g., deflect) a flow of fuel injected into the combustion chamber. Alternate embodiments may not include the bowl 222. The top surface 224 (which may be referred to herein as an outer surface) of the top wall 210 forms a bottom surface of the combustion chamber 203.

The piston 200 is coupled with a crankshaft of the engine via a connecting rod 216. A cylindrical portion 218 of the connecting rod 216 surrounds a bearing 238 of the piston 200 and enables a linear motion of the piston 200 within the combustion chamber to be converted into a rotational motion of the crankshaft of the engine via the connecting rod 216. The top wall 210 of the piston is positioned in a direction away from the base 215 and away from the connecting rod 216.

The base 215 of the piston 200 includes a hollow interior 220 (which may be referred to herein as a cavity or chamber). The interior 220 contains a gas (e.g., air) and is sealed (e.g., fluidly sealed) such that gas may not flow from the interior 220 into the combustion chamber or other areas of the engine (e.g., gas from the interior 220 does not mix and/or converge with gases within the combustion chamber). The interior 220 is partially formed by a bottom surface 226 of the top wall 210, and the gas within the interior 220 exerts a biasing force against the bottom surface 226 in order to press the wall in a direction away from the base 215 and along the central axis 206 (e.g., toward a top of the combustion chamber). As the top wall 210 is pressed away from the base 215, the bellows 228 is compressed between the top wall 210 and the crown 212. The first view 202 shows a position of the top wall 210 responsive to a lower pressure 230 of gases within the combustion chamber 203 against the top wall 210, and the second view 204 shows a position of the top wall 210 responsive to a higher pressure 232 of gases within the combustion chamber 203 against the top wall 210. In one example, the lower pressure 230 may be a pressure of gases when the piston 200 is a first distance from a top-dead-center position within the combustion chamber and the higher pressure 232 may be a pressure of gases when the piston 200 is a second distance from the top-dead-center position, with the first distance being greater than the second distance.

First view 202 shows the bellows 228 in a fully compressed position, and second view 204 shows the bellows 228 in a fully expanded position. In the fully compressed position, a length 234 of the bellows 228 in a direction parallel with the central axis 206 is increased relative to a length 236 of the bellows in the direction parallel with the central axis 206 when the bellows is in the fully expanded position. The bellows 228 may be moved from the fully compressed position shown by first view 202 and into the fully expanded position shown by second view 204 by increasing a pressure of gases within the combustion chamber 203 above a pressure of gas within the base 215 of the piston 200. Similarly, the bellows 228 may be moved from the fully expanded position to the fully compressed position by decreasing the pressure of gases within the combustion chamber below a pressure of gas within the base 215 of the piston 200. In one example, the pressure of gases within the combustion chamber 203 may be increased during combustion of an air/fuel mixture within the combustion chamber 203, and the pressure of gases within the combustion chamber 203 may be decreased during an exhaust stroke of a combustion cycle of the combustion chamber 203 (e.g., a duration in which gases are removed from the combustion chamber via actuation of an exhaust valve disposed within the combustion chamber, as described above with reference to FIG. 1). The bellows 228 may additionally be moved into a plurality of positions between the fully compressed position and the fully expanded position. The plurality of positions may be referred to herein as transitional positions, partially compressed positions, or partially expanded positions. In alternate embodiments, the length 234 of the bellows 228 in the fully compressed position may be a different amount of length than that shown by first view 202, and/or the length 236 of the bellows 228 in the fully expanded position may be a different amount of length than that shown by second view 204. A position of the top wall 210 during conditions in which the bellows 228 is in the fully compressed position may be referred to herein as a fully extended position of the top wall 210, and a position of the top wall 210 during conditions in which the bellows 228 is in the fully expanded position may be referred to herein as a fully retracted position of the top wall 210.

An amount of biasing force applied to the top wall 210 by the gas within the base 215 as described above varies with a temperature of the gas. The gas within the base 215 may be modeled as an ideal gas with its pressure defined by the ideal gas law $$P = \frac{nRT}{V},$$

where P is the pressure of gas within the base 215, V is a volume of the interior 220 of the base, n is an amount of gas contained within the base 215 in units of moles, R is the universal gas constant $$\left(\text{approximately } 8.3144598 \, \frac{\text{Joules}}{\text{moles} \cdot \text{Kelvin}}\right),$$

and T is a temperature of the gas contained within the base 215. As a temperature of the gas within the base 215 changes, the pressure and/or volume of the gas may also change according to the ideal gas law. For example, the top wall 210 may be in the position shown by first view 202 in which the bellows 228 is in the fully compressed position (e.g., compressed to the length 234), and engine operating conditions (e.g., engine load, speed, etc.) may result in a transfer of heat from the engine to the piston 200 and the gas contained within the base 215. As a result, the temperature of the gas contained within the base 215 may increase. Because the top wall 210 is in the fully extended position, the top wall 210 is prevented from moving away from the base 215 and does not increase the volume of the interior 220 of the base as the temperature of the gas increases. Increasing the temperature of the gas within the base 215 without increasing the volume of the gas within the base 215 thereby results in an increased pressure of the gas. The increased pressure of the gas increases the biasing force of the gas against the top wall 210 and increases an amount of gas pressure within the combustion chamber 203 needed to move the top wall 210 toward the base 215 (e.g., away from the fully extended position and toward the fully retracted position).

In another example, the top wall 210 may be in the fully extended position shown by first view 202, with the bellows 228 in the fully compressed position. A temperature of gas within the base 215 of the piston 200 may be reduced due to a reduced speed and/or load of the engine, for example. Heat may transfer from the piston 200 to other components of the engine (e.g., cylinder walls) and/or to exhaust gases flowing out of the combustion chamber, thereby cooling the piston. As the temperature of the gas within the base 215 of the piston 200 decreases, the pressure of the gas may also decrease in accordance with the ideal gas law. As a result, the biasing force of the gas within the base 215 against the top wall 210 is reduced, and an amount of gas pressure within the combustion chamber 203 needed to move the top wall 210 toward the base 215 (e.g., away from the fully extended position and toward the fully retracted position) is similarly reduced. The gas within the base 215 thereby biases the top wall 210 in a direction away from the base 215 such that the top wall 210 has a spring-like behavior in response to changes in gas pressure within the combustion chamber 203. For example, the biasing force of the gas within the base 215 against the top wall 210 may act according to Hooke's law $F=-Kx$, where F is the biasing force of the gas within the base 215 against the top wall 210, x is an amount of displacement of the top wall 210 relative to the base 215 from an initial position (e.g., the fully extended shown by the first view 202), and K is a modifier value dependent on the temperature of the gas within the base 215 in accordance with the ideal gas law (e.g., with higher temperatures of gas within the base 215 resulting in an increased value for K and with lower temperatures of gas within the base 215 resulting in a decreased value for K).

Because the pressure of the gas within the base 215 of the piston 200 determines the amount of biasing force of the gas against the top wall 210, and because the pressure of the gas within the base 215 varies at different temperatures according to the ideal gas law, an amount of movement of the top wall 210 relative to the base 215 in response to a gas pressure within the combustion chamber 203 may be different for different piston operating temperatures. For example, at lower piston operating temperatures (e.g., following a cold start of the engine, when the engine is adjusted from a non-operational mode in which fuel/air mixture is not combusted by engine cylinders to an operational mode in which fuel/air mixture is combusted by engine cylinders), the biasing force against the top wall 210 may be relatively lower. As a result, the top wall 210 may be moved toward the base 215 of the piston 200 by relatively lower gas pressures within the combustion chamber 203. In one example, for a duration following a cold start of the engine, a mean combustion chamber gas pressure may be 0.7-1.5 bar. A likelihood of knock is normally decreased during conditions in which the mean combustion chamber gas pressure (pressure averaged over one or more consecutive combustion cycles) is less than 5 bar. As a result, the base 215 may be configured to contain gas at a pressure higher than 1.5 bar (for example) at lower piston operating temperature for the duration following a cold start so that deflection of the top wall 210 does not occur. Similarly, during higher piston operating temperatures (e.g., during conditions of higher engine load than conditions immediately following a cold start), the biasing force against the top wall 210 may be relatively higher. As a result, the top wall 210 may not be moved toward the base 215 of the piston 200 by relatively lower gas pressures within the combustion chamber 203 and may instead move responsive to relatively higher gas pressures within the combustion chamber 203. For example, the piston may be configured to contain gas at a pressure slightly less than 5 bar during conditions in which the piston operating temperature is higher. Because a likelihood of knock is increased for conditions in which the mean combustion chamber gas pressure greater than 5 bar, configuring the piston in this way enables the top wall 210 of the piston to deflect at higher piston operating temperatures in order to reduce knock.

A controller (e.g., the controller shown by FIG. 1 and described above) may estimate a biasing force of the gas within the base 215 of the piston 200 against the top wall 210 of the piston 200 in order to adjust an ignition timing of the combustion chamber (e.g., adjust a spark discharge timing of a spark plug disposed within the combustion chamber). In one example, the controller may receive electrical signals from one or more engine temperature sensors (e.g., an exhaust gas temperature sensor, engine coolant temperature sensor, engine oil temperature, etc.) and may make a logical determination regarding the estimation of the biasing force (e.g., due to the temperature of the gas within the piston) based on logic rules that are a function of exhaust gas temperature, engine oil temperature, and/or engine coolant temperature. In this way, the controller may estimate the temperature of the gas within the piston (and the biasing force of the gas against the top wall of the piston) via the exhaust gas temperature, engine oil temperature, and/or engine coolant temperature. The controller may then generate a control signal that is sent to the spark plug (e.g., an actuator of the spark plug) in order to adjust the spark discharge timing of the spark plug. In another example, the controller may compare an amplitude, duration, and/or frequency of signals from the engine temperature sensors to values stored in a look-up table in non-transitory computer memory of the controller in order to estimate the biasing force of the gas within the piston against the top wall of the piston and to adjust the ignition timing responsive to the biasing force. The controller may estimate the biasing force based on a calculation using the look-up table with the input being engine coolant temperature and the output being the biasing force of the gas within the piston against the top wall of the piston, for example.

As one example of operation of the piston, the ignition timing of the combustion chamber may be adjusted (e.g., advanced or retarded) by a first amount when the estimated biasing force (e.g., estimated as described above) of the gas within the piston against the top wall of the piston is lower than a threshold biasing force. The ignition timing of the combustion chamber may be adjusted by a second amount different from the first amount when the estimated biasing force is higher than the threshold biasing force. In one example, the threshold biasing force may be an average biasing force of the piston at typical piston operating temperatures (e.g., during conditions in which engine load is above idle engine load and below maximum engine load). For example, a lookup table stored in non-transitory memory of the controller may include crank angle, combustion chamber gas pressure, and estimated biasing force of gas within the piston as inputs, with ignition timing as an output. At a peak combustion chamber gas pressure, the top wall of the piston may deflect toward the base, thereby storing mechanical energy in the piston via compression of the gas within the base. As the combustion chamber gas pressure decreases below the peak pressure (e.g., near an end of a power stroke of the combustion chamber), the stored mechanical energy is released via expansion of the gas within the piston and the top wall deflects away from the base. The ignition timing may be adjusted so that the release of stored mechanical energy occurs at a crankshaft angle that produces a higher amount of engine torque than other crankshaft angles. Typically, ignition timing is set so that peak combustion chamber gas pressures occur when the crankshaft angle is approximately 15 degrees after top-dead-center in order to produce a higher amount of engine torque. However, due to the varying biasing force of the gas within the piston during different engine operating conditions, peak engine torque may result when peak combustion chamber gas pressures occur at a different amount of crankshaft angle. As a result, the ignition timing is increased or decreased based on the biasing force of the gas within the piston in order to increase the amount of torque produced by the engine.

In other examples, the ignition timing may be adjusted based on an octane rating of fuel injected into the combustion chamber and the biasing force of the gas within the piston against the top wall of the piston. For example, the ignition timing of the combustion chamber may be adjusted (e.g., advanced or retarded) by a first amount when the estimated biasing force of the gas within the piston against the top wall of the piston is lower (e.g., estimated as described above), and may be further adjusted by a second amount based on the octane rating of fuel injected into the combustion chamber. The ignition timing of the combustion chamber may be adjusted by a third amount different from the first amount when the estimated biasing force is higher, and may further be adjusted by a fourth amount based on the octane rating of the fuel injected into the combustion chamber. Additional examples are described further below with reference to FIGS. 3-4.

In some examples, the engine may include a plurality of engine oil squirters positioned vertically below the piston 200 (e.g., positioned outside of the combustion chamber 203 and toward the crankshaft) configured to spray jets of engine oil in a direction upward toward the base 215 of the piston 200. The oil sprayed from the squirters may impinge upon a bottom exterior surface 259 of the base 215 in order to absorb thermal energy from the piston 200 and reduce a temperature of the piston 200 (e.g., to cool the piston). A flow rate of oil from the engine oil squirters may be adjusted by the controller in order to increase or decrease the amount of cooling of the piston 200. In this way, the controller may adjust the temperature of the piston 200 in order to adjust the amount of biasing force of the gas within the base 215 against the top wall 210 of the piston 200. For example, during conditions in which engine load is lower (e.g., during engine idling) and a temperature of the piston 200 is higher (e.g., due to a heating of the piston 200 resulting from a prolonged period of higher engine load immediately prior to the engine idling), the controller may increase the flow rate of oil from the engine oil squirters in order to reduce the temperature of the piston 200 and thereby increase the estimated biasing force of the gas within the base 215 against the top wall 210. Additionally, the controller may adjust the ignition timing based on the estimated biasing force as described above. By adjusting the ignition timing based on the estimated biasing force and adjusting the estimated biasing force by increasing or decreasing the flow rate of oil from the engine oil squirters, engine torque output may be controlled with increased precision and a likelihood of knock may be reduced.

FIG. 3 shows an example method 300 of adjusting engine operation in response to conditions of a pressure-reactive piston disposed within a combustion chamber of the engine. Specifically, the piston described below with reference to FIG. 3 may be the piston 200 described above with reference to FIG. 2 (e.g., a piston including a top wall biased by gas contained within a sealed base), and the engine may be similar to the engine described above with reference to FIG. 1. In the example shown by FIG. 3 and described below, an ignition timing of the combustion chamber is adjusted in response to an estimated biasing force of gas contained within the piston against the top wall (e.g., the wall that faces an interior of the combustion chamber and forms a bottom surface of the combustion chamber) of the piston. In alternate embodiments, a different engine parameter (e.g., engine speed, engine coolant flow, intake air flow, boost air amount, etc.) may be adjusted in response to the estimated biasing force. Although a single combustion chamber is described below with reference to the method 300 shown by FIG. 3, the routines described below may be applied to multiple combustion chambers of the engine. For example, the controller may adjust operation (e.g., ignition timing) of one or more combustion chambers of the engine independently of other combustion chambers of the engine according to the method 300 described below. In another example, the operation of each combustion chamber of the engine may be adjusted by a same amount according to method 300. In yet another example, the operation of one of more combustion chambers may be adjusted by a different amount than each other combustion chamber of the engine. Instructions for carrying out method 300 and the rest of the methods included herein may be executed by the controller based on instructions stored on a memory of the controller and in conjunction with signals received from sensors of the engine system, such as the sensors described above with reference to FIG. 1. The controller may employ engine actuators of the engine system to adjust engine operation, according to the methods described below. For example, the controller may adjust the ignition timing of the combustion chamber by adjusting a spark discharge of a spark plug disposed within the combustion chamber (e.g., adjusting a frequency, duration, etc. of electrical signals transmitted to the spark plug).

At 302, the method includes estimating and/or measuring engine operating conditions. Engine operating conditions may be estimated based on one or more outputs of various sensors in the engine system (e.g., such as various temperature sensors, pressure sensors, etc., as described above). Engine operating conditions may include engine speed and load, exhaust gas flow rate, mass air flow rate, coolant temperature, coolant flow rate, etc. The operating conditions may also include the operating conditions of the piston and/or combustion chamber (e.g., ignition timing, piston operating temperature, etc.).

The method continues to 304 where the method includes determining a knock amount of the engine. In one example, the knock amount may be determined by the controller based on signals received from an engine knock sensor. In another example, the knock amount may be estimated based on one or more engine operating conditions, such as fluctuations in engine torque output, NOx content within exhaust gas, etc. In one example, the knock amount may be a knock rate, with the knock rate corresponding to a number of times that an amplitude of a knock signal received by the controller exceeds a threshold amplitude within a predetermined duration of time (e.g., one or more complete and consecutive combustion cycles of an engine). In another example, the knock amount may be a knock intensity, with the knock intensity corresponding to an amplitude of a knock signal received by the controller. The amplitude of the knock signal may indicate a pressure of combustion gases within the combustion chamber. In yet other examples, the knock amount may be a combination of the knock rate and the knock intensity.

During engine operation, the method 300 may be executed (e.g., performed) by the controller multiple times in sequence. The controller may store a knock amount associated with each execution of the method 300 into non-transitory computer memory for reference at a later time. During execution of the method 300, the controller determines the knock amount at 304 for the most recent duration of engine operation (e.g., a most recent combustion cycle of the combustion chamber), referred to herein as a first duration or current duration. As described below with reference to 314, the knock amount associated with the current duration may be compared to a knock amount associated with a second duration (referred to herein as a previous duration) as determined during a previous execution of the method 300, with the second duration being an amount of time immediately prior to the current duration (e.g., a combustion cycle immediately prior to the most recent combustion cycle). If at 314 a knock amount for the previous duration has not been stored into computer memory (due to method 300 being executed for a first time, for example), the controller may assume that no knock has occurred for the previous duration.

The method continues to 306 where the method includes estimating a biasing force of the pressure-reactive piston. The biasing force acts against the top wall of the piston in the direction of the combustion chamber as described above with reference to FIG. 2. In one example, the biasing force may be based on an estimated operating temperature of the piston as described above with reference to FIG. 2, with the operating temperature corresponding to a pressure of gas within the piston according to the ideal gas law. In another example, the biasing force may be based on an estimated temperature of a mechanical biasing member disposed within the piston as described below with reference to FIG. 6. The controller may compare an amplitude, duration, and/or frequency of signals from engine temperature sensors (e.g., an exhaust gas temperature sensor, engine coolant temperature sensor, engine oil temperature sensor, etc.) to values stored in a look-up table in non-transitory computer memory of the controller in order to estimate the biasing force (e.g., the force exerted by gas within the piston against the top wall of the piston as described with reference to FIG. 2 or the force exerted by the mechanical biasing member against the top wall as described with reference to FIG. 6). The controller may estimate the biasing force based on a calculation using the look-up table with the input being engine coolant temperature, exhaust gas temperature, and/or engine oil temperature, and the output being the biasing force of the gas within the piston against the top wall of the piston, for example. In another example, the controller may make a logical determination regarding the estimation of the biasing force (e.g., due to the temperature of the gas within the piston) based on logic rules that are a function of exhaust gas temperature, engine oil temperature, and/or engine coolant temperature. In the example of the piston which includes gas contained within the piston, the pressure of the gas within the piston may be related to the biasing force via the equation $F=P/A$, where F is the biasing force of the gas against the top wall, P is the pressure of gas within the base of the piston, and A is a surface area of a bottom surface of the top wall of the piston (e.g., bottom surface 226 shown by FIG. 2 and described above). In the example of the piston which includes the mechanical biasing member biased against the top wall of the piston, the biasing force may be expressed as F=−Kx, where F is the biasing force of the mechanical biasing member against the top wall of the piston, x is an amount of displacement of the top wall relative to the base from an initial position (e.g., a fully extended position), and K is a modifier value (which may be referred to herein as a spring constant) dependent on the temperature of the mechanical biasing member (e.g., with higher temperatures resulting in a decreased value for K and with lower temperatures resulting in an increased value for K) and a shape and material of the mechanical biasing member. In some examples, the biasing force may be estimated for one or more strokes of a single combustion cycle (e.g., a first biasing force associated with a compression stroke of the single combustion cycle, a second biasing force associated with an expansion stroke of the single combustion cycle, etc.). In other examples, the estimated biasing force may be an averaged value for each stroke of the single combustion cycle. In yet other examples, the estimated biasing force may be an averaged value over several complete combustion cycles.

The estimated biasing force may be additionally based on an octane rating of fuel injected into the combustion chamber. For example, during conditions in which a fuel injected into the combustion chamber has a lower octane rating (e.g., an octane rating of 80), an ignition timing of the combustion chamber may be less advanced relative to conditions in which fuel is injected into the combustion chamber with a higher octane rating. An amount of heat transferred to the piston via the combustion gases and/or an operating temperature of the piston may therefore be reduced, and in the example of the piston that includes gas contained within the base (e.g., as shown by FIG. 2), the estimated biasing force of the gas within the piston may be decreased. In the example of the piston that includes the mechanical biasing member (e.g., as shown by FIG. 6), reducing the operating temperature of the piston results in the estimated biasing force of the mechanical biasing member against the top wall being increased. During conditions in which fuel with a higher octane rating (e.g., an octane rating of 95) is injected into the combustion chamber, the ignition timing of the combustion chamber may be more advanced (e.g., relative to conditions in which lower octane fuel is injected). This may increase the amount of heat transferred to the piston via the combustion gases and/or may increase an operating temperature of the piston, and in the example of the piston that includes gas contained within the base (e.g., as shown by FIG. 2), the estimated biasing force of the gas within the piston may be increased. In the example of the piston that includes the mechanical biasing member (e.g., as shown by FIG. 6), increasing the operating temperature of the piston results in the estimated biasing force of the mechanical biasing member against the top wall being decreased. The estimated biasing force may therefore be based on the piston operating temperature and an initial ignition timing associated with the fuel octane rating. In one example, the biasing force may first be estimated according to the fuel octane rating and the estimated biasing force may then be adjusted according to an output of one or more engine temperature sensors as described above. In other examples, the biasing force may be estimated via a look-up table stored in non-transitory memory of the controller, with inputs being piston operating temperature (e.g., determined based on coolant temperature, engine oil temperature, and/or exhaust gas temperature as described above) and fuel octane rating, and an output being the biasing force of gas contained within the piston as a function of piston position.

The method continues to 308 where the method includes determining whether the current knock amount is greater than a threshold knock amount. In one example, the current knock amount may be a knock rate as described above with reference to 304, and the controller may compare the knock rate to a pre-determined threshold knock rate. The pre-determined threshold knock rate may correspond to a knock rate at which engine efficiency (e.g., fuel consumption) is decreased and/or a desired noise level of the engine is exceeded, for example. In another example, the current knock amount may be a knock intensity as described above with reference to 304, and the controller may compare the knock intensity to a pre-determined threshold knock intensity. Similarly, the pre-determined threshold knock intensity may be a knock intensity at which engine efficiency and/or a desired noise level of the engine is exceeded, in one example.

If the current knock amount is not greater than the threshold knock amount at 308, the method continues to 310 where the method includes determining a desired ignition timing relative to a pre-determined standard ignition timing based on the estimated piston biasing force. The controller may compare a value of the estimated piston biasing force (e.g., estimated from engine temperature sensors as described above) to values stored in a look-up table in non-transitory computer memory of the controller in order to determine the desired ignition timing, with an input being estimated piston biasing force and an output being desired ignition timing, for example. In another example, the controller may make a logical determination regarding the desired ignition timing based on logic rules that are a function of estimated piston biasing force. During conditions in which the estimated piston biasing force is higher, the top wall of the piston may be less likely to move in response to typical combustion gas pressures within the combustion chamber. For example, the estimated piston biasing force may be higher than an average piston biasing force associated with piston operating temperatures at engine idling conditions. The decreased likelihood of movement of the top wall of the piston may result in an increased compression ratio of the combustion chamber relative to conditions in which the top wall of the piston is more easily moved (e.g., during conditions in which the estimated piston biasing force is lower). In one example with reference to the piston shown by FIG. 2 and described above, the estimated piston biasing force may be higher due to a relatively higher operating temperature of the piston (e.g., relative to a piston operating temperature during engine idling conditions) or lower due to a relatively lower operating temperature of the piston (e.g., relative to a piston operating temperature during conditions in which the engine is loaded and not idling). As a result, the controller may determine the desired ignition timing to be retarded or advanced (respectively) relative to the pre-determined standard ignition timing (e.g., an ignition timing including no adjustments made with respect to the estimated piston biasing force) in order to adjust the compression ratio of the combustion chamber. In another example with reference to the piston shown by FIG. 6 and described below, the estimated piston biasing force may be lower due to a relatively higher operating temperature of the piston (e.g., relative to a piston operating temperature during engine idling conditions) or higher due to a relatively lower operating temperature of the piston (e.g., relative to a piston operating temperature during conditions in which the engine is loaded and not idling). As a result, the controller may determine the desired ignition timing to be advanced or retarded (respectively) relative to the pre-determined standard ignition timing (e.g., an ignition timing including no adjustments made with respect to the estimated piston biasing force) in order to adjust the compression ratio of the combustion chamber.

In other examples, the desired ignition timing may be determined in order to adjust an amount of mechanical energy stored and released by the piston during compression and expansion of gases within the combustion chamber. For example, during conditions in which the estimated piston biasing force is higher, the controller may determine the desired ignition timing to be advanced relative to the pre-determined standard ignition timing in order to increase gas pressures within the combustion chamber and to move the top wall of the piston from an extended position to a partially retracted or fully retracted position (e.g., the extended position and retracted position shown by FIG. 2 and described above). In this way, a greater amount of potential energy may be stored within the piston (e.g., stored as compression of the gas within the piston or compression of the mechanical biasing member) during an expansion stroke (e.g., power stroke) of a single combustion cycle following ignition of the gases and fuel within the combustion chamber. The stored potential energy may then be converted to kinetic energy at a later time during the single combustion cycle (e.g., via expansion of the gas within the piston when a pressure of gases within the combustion chamber is decreased or via expansion of the mechanical biasing member), thereby accelerating a motion of the piston within the combustion chamber and increasing an efficiency of the engine.

The desired ignition timing may also be based on the octane rating of fuel injected into the combustion chamber as described above with reference to 306. In one example, the controller may determine the desired ignition timing by adjusting the pre-determined standard ignition timing by a first amount based on the estimated biasing force and by a second amount based on the fuel octane rating.

The method then continues to 312 where the method includes adjusting ignition timing to the desired ignition timing. In one example, the controller may adjust a frequency, phase, and/or duration of electrical signals transmitted to an actuator of a spark plug disposed within the combustion chamber in order to adjust the ignition timing (e.g., in order to adjust an energization of the ignition coil and spark discharge timing of the spark plug via adjustment of the electrical signals sent to the spark plug actuator). As an example, when the piston is at a topmost position of the combustion chamber (referred to herein as top dead center or TDC), a rotational angle of a crankshaft coupled to the piston may be 0 degrees. The pre-determined standard ignition timing referenced at 310 may be a timing at which discharge of the spark plug and ignition of gases within the combustion chamber occurs with the piston positioned slightly below TDC and moving towards TDC, and an angle of the crankshaft may be 10 degrees (e.g., relative to the angle when the piston is in the TDC position). The controller may adjust the phase of the electrical signals transmitted to the spark plug (e.g., may adjust an amount of time between each energization of the ignition coil and the discharge of spark via the spark plug) so that ignition of gases within the combustion chamber occurs instead when the angle of the crankshaft is 14 degrees (for example), thereby advancing the ignition timing. As another example, the controller may adjust the phase of electrical signals transmitted to the spark plug so that ignition of gases within the combustion chamber occurs when the angle of the crankshaft is 6 degrees, thereby retarding (e.g., delaying) the ignition timing. In other examples, the ignition timing may be advanced and/or retarded by a different amount.

If the current knock amount is greater than the threshold knock amount at 308, the method continues to 314 where the method includes determining whether the previous knock amount is greater than the threshold knock amount. The previous knock amount may be the knock amount determined during the previous duration of engine operation (e.g., immediately prior to the current duration), as described above.

If the previous knock amount is not greater than the threshold knock amount at 314, the method continues to 316 where the method includes determining a desired ignition timing relative to a pre-determined standard ignition timing based on the estimated piston biasing force and the current knock amount. In the example shown, the pre-determined standard ignition timing is the same pre-determined standard ignition timing described above with reference to 310 and 312. In one example, at 316 the controller may determine the desired ignition timing by computing a first adjustment to the pre-determined standard ignition timing based on the estimated piston biasing force and computing a second adjustment to the pre-determined standard ignition timing based on the current knock amount. The desired ignition timing may be an ignition timing resulting from the first adjustment and second adjustment applied to the pre-determined standard ignition timing. For example, the first adjustment may advance or retard the ignition timing based on whether the estimated piston biasing force is higher or lower (e.g., as described above with reference to 310). The second adjustment may then additionally advance or retard the ignition timing based on the current knock amount (e.g., a magnitude of the knock rate or knock intensity as described above with reference to 304). A higher knock rate and/or higher knock intensity may result in a higher amount of retarding of the ignition timing via the second adjustment. However, if the first adjustment is a higher amount of advancement of the ignition timing and the second adjustment is a lower amount of retarding of the ignition timing, the desired ignition timing may be advanced relative to the pre-determined standard ignition timing.

The method then continues to 318 where the method includes adjusting ignition timing to the desired ignition timing. As described above with reference to 312, the ignition timing is adjusted to the desired ignition timing relative to the pre-determined standard ignition timing. The controller may adjust a frequency, phase, and/or duration of electrical signals transmitted to a spark plug disposed within the combustion chamber in order to adjust the ignition timing to the desired ignition timing.

If the previous knock amount is greater than the threshold knock amount at 314, the method continues to 320 where the method includes determining a desired ignition timing relative to a pre-determined standard ignition timing based on the piston biasing force and the previous knock amount. The pre-determined standard ignition timing is the same pre-determined standard ignition timing described above with reference to 310, 312, and 316. In one example, at 320 the controller may determine the desired ignition timing by computing a first adjustment to the pre-determined standard ignition timing based on the estimated piston biasing force and computing a second adjustment to the pre-determined standard ignition timing based on the previous knock amount. The desired ignition timing may be an ignition timing resulting from the first adjustment and second adjustment applied to the pre-determined standard ignition timing. For example, the first adjustment may advance or retard the ignition timing based on whether the estimated piston biasing force is higher or lower (e.g., as described above with reference to 310). The second adjustment may then additionally advance or retard the ignition timing based on the previous knock amount (e.g., a magnitude of the knock rate or knock intensity as described above with reference to 304). A higher knock rate and/or higher knock intensity may result in a higher amount of retarding of the ignition timing via the second adjustment. By adjusting the ignition timing in this way, a likelihood of knock occurring during durations of engine operation following the current duration may be reduced. A higher previous knock amount and a higher current knock amount (e.g., during conditions in which the previous knock amount and current knock amount each exceed the threshold knock amount) may indicate that the combustion chamber is prone to knocking, and the ignition timing may be adjusted accordingly. As a result, a likelihood of knock occurring during later durations of engine operation may be reduced.

The method then continues to 322 where the method includes adjusting ignition timing to the desired ignition timing. As described above with reference to 312 and 318, the ignition timing is adjusted to the desired ignition timing relative to the pre-determined standard ignition timing. The controller may adjust a frequency, phase, and/or duration of electrical signals transmitted to a spark plug disposed within the combustion chamber in order to adjust the ignition timing to the desired ignition timing.

By adjusting engine operation according to the method 300 described above, the compression ratio of the combustion chamber and the amount of work produced by the engine may be controlled with greater precision. Combustion energy (e.g., kinetic energy of combustion gases during ignition) may be partially conserved by the piston and utilized to accelerate the motion of the crankshaft via the connecting rod coupled to the piston. Additionally, by storing a portion of combustion energy within the piston, gas pressure within the combustion chamber may be reduced during ignition, thereby reducing a likelihood of knock. The controller may adjust the ignition timing based on the biasing force of gas within the piston and/or the knock amount of the combustion chamber (e.g., the previous knock amount and/or current knock amount described above) in order to reduce knock and increase engine efficiency.

FIG. 4 shows a graph illustrating operating conditions of an engine (e.g., the engine shown by FIG. 1 and described above) including a pressure-reactive piston (e.g., the piston shown by FIG. 2 and described above) disposed within a combustion chamber according to the method 300 described above with reference to FIG. 3. Specifically, graph 400 includes plots for engine load 402, coolant temperature 404, exhaust gas temperature 406, knock signal 408, estimated piston biasing force 410, and ignition timing 412. Adjustments to ignition timing in response to engine operating conditions (e.g., the estimated piston biasing force) are described in further detail below.

Between times t0 and t1 shown by graph 400, engine load 402 increases sharply, then remains relatively constant at a first value, and then increases again to a second value, just prior to time t1. In one example, the increase in engine load may be due to a cold-start of the engine (e.g., a condition in which the engine is adjusted from a non-operational mode in which fuel and air are not combusted within engine cylinders to an operational mode in which fuel and air are combusted within engine cylinders). As a result of the increased engine load, engine coolant temperature 404 and exhaust gas temperature 406 each increase accordingly. The controller may receive signals from an engine coolant temperature sensor, engine oil temperature sensor, and/or an exhaust gas temperature sensor in order to determine the estimated biasing force 410 of gas within the piston against a top wall of the piston as described above with reference to FIG. 2. As the coolant temperature and exhaust gas temperatures increase, the estimated biasing force also increases due to a correlation between the increased coolant/exhaust gas temperatures and an operating temperature of the engine. The operating temperature of the engine may be indicative of a temperature of gas contained within the piston, and the temperature of the gas is directly related to the pressure of the gas as described above with reference to FIG. 2 (e.g., in accordance with the ideal gas law).

Due to (e.g., in response to) the increase in estimated biasing force between times t0 and t1, the ignition timing 412 is advanced by the controller. Advancing the ignition timing may include adjusting an energization of the ignition coil and adjusting the spark discharge timing of a spark plug disposed within the combustion chamber such that spark discharge occurs at an earlier time relative to a pre-determined standard ignition timing 414 during a single combustion cycle. In one example, advancing the ignition timing may increase a pressure of combustion gases within the combustion chamber, thereby increasing an amount of force applied by the combustion gases within the combustion chamber to the top wall of the piston in a direction of a base of the piston (e.g., top wall 210 and base 215 shown by FIG. 2 and described above). The force applied to the top wall in the direction of the base of the piston (by the combustion gases) may be increased relative to the biasing force applied to the top wall in the opposite direction (by gas contained within the base). As a result, the top wall may be moved from a fully extended position (as shown by the first view of FIG. 2 and described above) into a partially or fully retracted position (as shown by the second view of FIG. 2 and described above). In this way, a portion of kinetic energy transferred to the piston via expansion of the combustible air/fuel mixture during ignition in a single combustion cycle may be stored within the piston as potential energy (e.g., via compression of the gas contained within the base of the piston by the top wall). The potential energy stored within the piston may then be released at a later time during the single combustion cycle in order to accelerate the motion of the crankshaft via the piston and connecting rod arrangement (e.g., during an expansion stroke of the single combustion cycle). In this way, a likelihood of knock may be reduced and an efficiency of the engine (e.g., an amount of work produced by the engine relative to an amount of fuel/air combusted within the combustion chamber) may be increased.

Between times t1 and t2, engine load 402 remains relatively constant. Coolant temperature 404 and exhaust gas temperature 406 each increase slightly. As a result, the estimated biasing force 410 (as determined by the controller) also increases slightly. However, between times t1 and t2 the knock signal 408 increases above a knock threshold 409 three times. Accordingly, the controller determines that the knock rate between times t1 and t2 is greater than a threshold knock rate, and the ignition timing 412 is not advanced further. Instead, the ignition timing remains approximately constant relative to the amount of advancement shown at time t1.

Between times t2 and t3, engine load 402, coolant temperature 404, and exhaust gas temperature 406 each increase. As a result, the estimated biasing force 410 also increases. Knock signal 408 does not increase above the knock threshold 409. However, due to the increased knock rate between times t1 and t2, the ignition timing 412 between times t2 and t3 is retarded (e.g., decreased) relative to the ignition timing between times t1 and t2. In one example, retarding the ignition timing relative to the ignition timing between times t1 and t2 may reduce a pressure of combustion gases within the combustion chamber. The reduced pressure of the combustion gases may reduce a likelihood of knock occurrence.

Between times t3 and t4, engine load 402, coolant temperature 404, and exhaust gas temperature 406 continue to increase. As a result, the estimated biasing force 410 also continues to increase. The knock signal 408 is increased above the knock threshold 409 three times between times t3 and t4. The controller then determines that the knock rate between times t3 and t4 is greater than a threshold knock rate, and the ignition timing 412 is further decreased.

Between times t4 and t5, the engine load 402, coolant temperature 404, exhaust gas temperature 406, and estimated biasing force 410 each decrease. The knock signal 408 does not increase above the knock threshold 409. However, the ignition timing 412 continues to retard (e.g., decrease) due to the knock rate exceeding the threshold knock rate between times t3 and t4. Between times t4 and t5, due to the higher engine load, coolant temperature, and exhaust gas temperature, a pressure of combustion gases within the combustion chamber may be relatively higher (e.g., relative to conditions in which engine load and coolant/exhaust temperatures are lower). Retarding the ignition timing via the controller may reduce a likelihood of knock by reducing peak combustion chamber gas pressures.

Between times t5 and t6, engine load 402, coolant temperature 404, and exhaust gas temperature 406 each continue to decrease. The knock signal 408 does not exceed the knock threshold 409. Due to the decreasing engine load 402, coolant temperature 404, and exhaust gas temperature 406, the estimated biasing force 410 is also decreased. As a result, the ignition timing 412 is advanced (e.g., increased) relative to the ignition timing shown at time t5. In one example, by advancing the ignition timing between times t5 and t6 in response to the decreasing estimated biasing force, a pressure of combustion gases within the combustion chamber may be increased and an amount of potential energy stored within the piston during each combustion cycle (as described above) may be increased. In this way, an efficiency of the engine may be increased.

After time t6, engine load 402 remains approximately constant with slight fluctuations. Coolant temperature 404 and exhaust gas temperature 406 each gradually decrease and then remain approximately constant. Accordingly, the estimated biasing force 410 decreases slightly but remains approximately constant. The knock signal 408 does not exceed the knock threshold 409. Due to the slight decrease in the estimated biasing force 410, the ignition timing 412 is slightly advanced relative to the ignition timing shown at time t6. By adjusting ignition timing in response to the estimated piston biasing force as described above with reference to FIG. 6, knock may be reduced and/or eliminated when detected by the controller. Additionally, the controller may adjust ignition timing further in order to reduce a likelihood of knock occurrence for upcoming duration of engine operation (e.g., as predictive knock prevention). In some examples as described below with reference to FIG. 5 and above with reference to FIG. 3, the controller may additionally adjust ignition timing in response to an octane rating of fuel injected into engine combustion chambers.

FIG. 5 shows a graph 500 illustrating ignition advancement relative to an estimated piston biasing force for a fuel with a first octane rating at a first plot 502 and a second fuel with a second octane rating at a second plot 504. As described above with reference to method 300 shown by FIG. 3, ignition advancement corresponds to an adjustment to combustion chamber ignition timing relative to a pre-determined standard ignition timing 508. In one example, estimated piston biasing force may be an estimated amount of force exerted by gas contained within a piston against a top wall of the piston (as described above with reference to FIGS. 2-3) and may be an averaged value over one or more combustion cycles of a combustion chamber. In another example, estimated piston biasing force may be an estimated amount of force exerted by a mechanical biasing member disposed within the piston against the top wall of the piston (as described above with reference to FIG. 3 and below with reference to FIG. 6) and may be an averaged value over one or more combustion cycles of a combustion chamber.

In one example, the first plot 502 may correspond to a first fuel with a lower octane rating (e.g., an octane rating of 70) and the second plot 504 may correspond to a second fuel with a relatively higher octane rating (e.g., an octane rating of 92). As shown by FIG. 5, ignition advancement relative to the pre-determined standard ignition timing may be different for fuels with different octanes. For example, for lower piston biasing forces, ignition advancement for the first fuel (the lower octane fuel) may be greater relative to ignition advancement for the second fuel (the higher octane fuel). However, for higher piston biasing forces, a difference in ignition advancement for the first fuel and the second fuel may be decreased (e.g., relative to ignition advancement at lower piston biasing forces). Each fuel may have a different rate of combustion within the combustion chamber and may therefore result in different piston operating conditions when injected into the combustion chamber.

FIG. 6 show a first view 690 and a second view 692 of an alternate embodiment of a pressure-reactive piston 600 disposed within a combustion chamber 603 of an engine. First view 690 and second view 692 each show the piston 600 in different positions during a single combustion cycle of the combustion chamber 603. Specifically, first view 690 shows the piston 600 at a first position during a power stroke (e.g., gas expansion stroke) of the single combustion cycle and second view 692 shows the piston 600 at a second position during the power stroke of the single combustion cycle, with the piston 600 moving from the first position to the second position during the power stroke (e.g., in a direction away from a top surface 660 of the combustion chamber 603).

Piston 600 includes a crown 602, a base 611, and a skirt 606 extending between the crown 602 and base 611 in a direction parallel to a central axis 665 of the piston 600. The piston 600 is coupled with a crankshaft of the engine via a connecting rod 618. The connecting rod 618 surrounds a bearing surface 616 of the piston 600 and enables a linear motion of the piston 600 within the combustion chamber to be converted into a rotational motion of the crankshaft of the engine via the connecting rod 618. A top wall 609 of the piston 600 is positioned in a direction away from the base 611 and away from the connecting rod 618.

The top wall 609 is formed by an exterior surface 601 of the piston 600 (e.g., a surface forming a bottom of the combustion chamber) and a first interior surface 610 of the piston 600. The piston 600 includes a mechanical biasing member 604 (e.g., a spring) formed by a plurality of annular rings 605 (e.g., Belleville washers). In alternate embodiments, the mechanical biasing member 604 may be a different type of biasing member (e.g., a multi-leaf spring) and/or may be formed by components having a different size, shape, and/or relative arrangement. Mechanical biasing member 604 is positioned between the first interior surface 610 of the piston 600 and a second interior surface 608 of the piston 600 and is compressible in a direction parallel with the central axis 665. An aperture 614 (e.g., gap) positioned between the skirt 606 and crown 602 enables the crown 602 to move toward the base 611 when the mechanical biasing member 604 is compressed as described below.

During operation of the engine, gas pressure within the combustion chamber 603 results in a force against the top wall 609 of the piston 600 in the direction of the base 611. For example, the biasing force of the mechanical biasing member 604 against the top wall 609 may act according to Hooke's law F=−Kx, where F is the biasing force of the mechanical biasing member 604 against the top wall 609, x is an amount of displacement of the top wall 609 relative to the base 611 from an initial position (e.g., the fully extended shown by the first view 690), and K is a modifier value (which may be referred to herein as a spring constant) dependent on the temperature of the mechanical biasing member 604 (e.g., with higher temperatures resulting in a decreased value for K and with lower temperatures resulting in an increased value for K) and a shape and material of the mechanical biasing member 604 (e.g., an amount and material of annular rings 605). The mechanical biasing member 604 may be configured with a spring constant such that the mechanical biasing member 604 does not fully compress in response to lower combustion chamber gas pressures (e.g., gas pressures corresponding to lower engine loads, such as immediately following a cold-start of the engine). However, if the gas pressure within the combustion chamber is greater than a threshold gas pressure (e.g., 5 bar), the mechanical biasing member 604 may compressed from an extended position shown by first view 690 (e.g., a position in which the mechanical biasing member 604 has a first length 612 in a direction parallel to the central axis 665) to a fully compressed position shown by second view 692 (e.g., a position in which the mechanical biasing member 604 has a second length 613 in the direction parallel to the central axis 665, with the second length 613 being less than the first length 612).

Additionally, the mechanical biasing member 604 may be compressed from the extended position shown by first view 690 to a plurality of positions between the extended position and the fully compressed position shown by second view 692 in response to increased gas pressures within the combustion chamber 603 (e.g., increased relative to a first pressure 650 shown by first view 690). The first pressure 650 of gas within the combustion chamber 603 shown by first view 690 is much less than the threshold gas pressure (e.g., 1 bar). In one example, the first pressure 650 may be a pressure of gases within the combustion chamber 603 immediately prior to ignition of the gases via discharge of spark by a spark plug disposed within the combustion chamber (e.g., similar to the spark plug 192 shown by FIG. 1 and described above). As a result, the mechanical biasing member 604 is not compressed to the fully compressed position. However, in second view 692, the gases within the combustion chamber 603 are at a second pressure 652 greater than the threshold gas pressure. In one example, the second pressure 652 may be a pressure of gases within the combustion chamber 603 immediately following ignition of the gases via discharge of spark by the spark plug. Ignition of the gases within the combustion chamber 603 causes the gases to rapidly expand and the pressure of the gases is increased (e.g., relative to the first pressure 650). Due to the second pressure 652 being higher than the threshold gas pressure, the top wall of the piston 600 is moved toward the base 611 and the mechanical biasing member 604 is moved into the fully compressed position. In this way, kinetic energy of the expanding gases is stored as potential energy by the mechanical biasing member 604. The potential energy stored by the mechanical biasing member 694 may then be released at a later time during the single combustion cycle in order to accelerate the motion of the crankshaft via the piston and connecting rod arrangement (e.g., during conditions in which the pressure of gases within the combustion chamber is decreased below the threshold gas pressure after ignition during the single combustion cycle).

In one example, at least a portion of the mechanical biasing member 604 may be formed of a metal (e.g., stainless steel). As a temperature of the mechanical biasing member 604 is increased (due to increased piston operating temperature resulting from increased engine load, for example), a stiffness (e.g., spring constant) of the mechanical biasing member 604 may decrease. As a result, an amount of biasing force applied to the top wall 609 by the mechanical biasing member 604 is decreased and the mechanical biasing member 604 may be more easily compressed. The threshold gas pressure is thereby reduced such that the mechanical biasing member 604 may fully compress in response to lower combustion chamber gas pressures. Similarly, during conditions in which the temperature of the mechanical biasing member 604 is decreased (e.g., during conditions in which engine load is lower and a decreased amount of heat is transferred to the piston 600), the stiffness of the mechanical biasing member 604 and the threshold gas pressure are each increased.

Because the stiffness of the mechanical biasing member 604 varies with temperature, the mechanical biasing member 604 may compress and/or expand at different times for different engine operating conditions. For example, a first engine operating condition may be a condition in which engine load is lower and a temperature of the mechanical biasing member 604 is lower (e.g., following a cold start of the engine), and an ignition timing of the combustion chamber 603 is set to a pre-determined standard ignition timing by a controller of the engine (e.g., controller 12 shown by FIG. 1 and described above). In one example, the pre-determined standard ignition timing may be a timing in which spark is discharged from the spark plug during a compression stroke of the combustion chamber 603 when the piston is at a particular position within the combustion chamber (e.g., a position corresponding to 14 degrees of crankshaft rotation less than an amount of crankshaft rotation at which the piston reaches the top-dead-center position). A second engine operating condition may be a condition in which engine load is higher and a temperature of the mechanical biasing member 604 is higher (e.g., during a duration of increased fuel injection and air intake into engine combustion chambers relative to the first engine operating condition described above), and the ignition timing of the combustion chamber 603 is set to the pre-determined standard ignition timing.

During conditions in which the engine is operating in the first operating condition described above, compression and expansion of the mechanical biasing member 604 may occur earlier in a combustion cycle relative to conditions in which the engine is operating in the second operating condition. In one example, during a power stroke of a combustion cycle of the combustion chamber 603 when the engine is in the first operating condition, the mechanical biasing member 604 may be compressed when the crankshaft is rotated by about 15 degrees (in one example) greater than the rotational amount at which the piston is in the top-dead-center position. However, during a power stroke of a combustion cycle of the combustion chamber 603 when the engine is in the second operating condition, the mechanical biasing member 604 may be compressed when the crankshaft is rotated by about 13 degrees (in one example) greater than the rotational amount at which the piston is in the top-dead-center position. As a result, compression and expansion of the mechanical biasing member 604 during the first operating condition may result in a different amount of torque against the crankshaft than compression and expansion of the mechanical biasing member 604 during the second operating condition.

In order to increase the amount of torque against the crankshaft resulting from compression and expansion of the mechanical biasing member 604 for various engine operating conditions (e.g., such as the first operating condition and second operating condition described above), the controller of the engine may adjust the ignition timing of the combustion chamber (e.g., advance or retard the timing of spark discharge from the spark plug) relative to the pre-determined standard ignition timing based on an estimated biasing force of the mechanical biasing member 604. The estimated biasing force may be estimated by the controller based on an output of one or more sensors of the engine system, such as the sensors described above with reference to FIG. 1.

In one example, the controller may receive electrical signals from one or more engine temperature sensors (e.g., an exhaust gas temperature sensor, engine coolant temperature sensor, engine oil temperature sensor, etc.) and may make a logical determination regarding the estimation of the biasing force (e.g., due to the temperature of mechanical biasing member 604) based on logic rules that are a function of exhaust gas temperature, engine oil temperature, and/or engine coolant temperature. In this way, the controller may estimate the temperature of the mechanical biasing member 604 (and the biasing force of the mechanical biasing member 604 against the top wall of the piston) via the exhaust gas temperature, engine oil temperature, and/or engine coolant temperature. The controller may then generate a control signal that is sent to the spark plug (e.g., an actuator of the spark plug) in order to adjust the spark discharge timing of the spark plug. In another example, the controller may compare an amplitude, duration, and/or frequency of signals from the engine temperature sensors to values stored in a look-up table in non-transitory computer memory of the controller in order to estimate the biasing force of mechanical biasing member 604 against the top wall of the piston and to adjust the ignition timing responsive to the biasing force. The controller may estimate the biasing force based on a calculation using the look-up table with the input being engine oil temperature and the output being the biasing force of the mechanical biasing member 604 against the top wall of the piston, for example.

In some examples, the engine may include a plurality of engine oil squirters positioned vertically below the piston 600 (e.g., positioned outside of the combustion chamber 603 and toward the crankshaft) configured to spray jets of engine oil in a direction upward toward the base 611 of the piston 600. The oil sprayed from the squirters may impinge upon a bottom exterior surface 617 of the base 611 in order to absorb thermal energy from the piston 600 and reduce a temperature of the piston 600 (e.g., to cool the piston). A flow rate of oil from the engine oil squirters may be adjusted by the controller in order to increase or decrease the amount of cooling of the piston 600. In this way, the controller may adjust the temperature of the piston 600 in order to adjust the amount of biasing force of the mechanical biasing member 604 against the top wall 609 of the piston 600. For example, during conditions in which engine load is lower (e.g., during engine idling) and a temperature of the piston 600 is higher (e.g., due to a heating of the piston 600 resulting from a prolonged period of higher engine load immediately prior to the engine idling), the controller may increase the flow rate of oil from the engine oil squirters in order to reduce the temperature of the piston 600 and thereby increase the estimated biasing force of the mechanical biasing member 604. Additionally, the controller may adjust the ignition timing based on the estimated biasing force as described above. By adjusting the ignition timing based on the estimated biasing force and adjusting the estimated biasing force by increasing or decreasing the flow rate of oil from the engine oil squirters, engine torque output may be controlled with increased precision and a likelihood of knock may be reduced.

FIG. 2 and FIG. 6 each show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The technical effect of adjusting ignition timing based on the estimated biasing force of gas contained within the pressure-reactive piston is to control the compression ratio of the combustion chamber to increase engine torque output and reduce knock. In this way, the compression ratio of the combustion chamber may be controlled with increased precision. Compression of the gas within the piston may reduce the compression ratio of the combustion chamber during conditions in which gas pressure within the combustion chamber is higher, thereby reducing a likelihood of auto-ignition of fuel within the combustion chamber and reducing knock occurrences. Additionally, mechanical energy may be stored within the piston by compressing the gas within the piston, and the mechanical energy may be later released by the piston in order to increase engine performance.

In one embodiment, a method comprises: estimating a biasing force of a pressure-reactive piston disposed within a combustion chamber of an engine; and adjusting an operating parameter of the engine based on the estimated biasing force. In a first example of the method, adjusting the operating parameter of the engine includes adjusting an ignition timing of the combustion chamber. A second example of the method optionally includes the first example, and further includes wherein adjusting the ignition timing includes advancing the ignition timing relative to a pre-determined standard ignition timing or retarding the ignition timing relative to the pre-determined standard ignition timing. A third example of the method optionally includes one or both of the first and second examples, and further includes wherein advancing and retarding the ignition timing is responsive to the estimated biasing force being greater than or less than a threshold biasing force. A fourth example of the method optionally includes one or more or each of the first through third examples, and further includes determining an engine knock amount based on an output of an engine knock sensor and adjusting the operating parameter of the engine based on the engine knock amount. A fifth example of the method optionally includes one or more or each of the first through fourth examples, and further includes wherein the operating parameter of the engine is adjusted by a first amount based on the estimated biasing force, wherein the operating parameter of the engine is adjusted by a second amount based on the engine knock amount, and wherein the first amount is different than the second amount. A sixth example of the method optionally includes one or more or each of the first through fifth examples, and further includes wherein the engine knock amount includes a knock intensity corresponding to an amount by which the output of the engine knock sensor exceeds a threshold output, and wherein adjusting the engine parameter reduces the knock intensity. A seventh example of the method optionally includes one or more or each of the first through sixth examples, and further includes wherein the engine knock amount includes a knock rate, and wherein adjusting the engine parameter reduces the knock rate. An eighth example of the method optionally includes one or more or each of the first through seventh examples, and further includes wherein the knock rate is determined over at least one complete combustion cycle of the combustion chamber. A ninth example of the method optionally includes one or more or each of the first through eighth examples, and further includes wherein the biasing force is estimated based on at least one of an output of an engine coolant temperature sensor, an output of an engine oil temperature sensor, or an output of an engine exhaust gas temperature sensor. A tenth example of the method optionally includes one or more or each of the first through ninth examples, and further includes wherein the combustion chamber is one of a plurality of combustion chambers, and wherein adjusting the operating parameter includes adjusting an ignition timing of each combustion chamber of the plurality of combustion chambers.

In another embodiment, a method comprises: estimating a biasing force of a pressure-reactive piston disposed within a combustion chamber of an engine; and adjusting an ignition timing of the combustion chamber based on the estimated biasing force and an octane rating of fuel injected into the combustion chamber. In a first example of the method, estimating the biasing force includes measuring an output of at least one engine temperature sensor to estimate a temperature of gas sealed within the pressure-reactive piston. A second example of the method optionally includes the first example, and further includes wherein estimating the biasing force includes calculating a pressure of the gas sealed within the pressure-reactive piston based on the temperature of the gas. A third example of the method optionally includes one or both of the first and second examples, and further includes wherein adjusting the ignition timing includes advancing or retarding the ignition timing by a first amount relative to a pre-determined standard ignition timing based on the estimated biasing force and advancing or retarding the ignition timing by a second amount relative to the pre-determined standard ignition timing based on the octane rating of the fuel injected into the combustion chamber with the first amount being different than the second amount. A fourth example of the method optionally includes one or more or each of the first through third examples, and further includes adjusting the ignition timing of the combustion chamber by a third amount relative to the pre-determined standard ignition timing based on both of the estimated biasing force and the octane rating of the fuel injected into the combustion chamber, with the third amount being different than the first amount and second amount.

In one example, a system includes: an engine including a combustion chamber and a spark plug disposed therein; a pressure-reactive piston disposed within the combustion chamber, the piston including a top wall movable relative to a base of the piston and positioned away from the base, the top wall biased away from the base by gas contained within the base; and a controller including computer-readable instructions stored in non-transitory memory for estimating a biasing force of the gas against the top wall and adjusting a spark discharge timing of the spark plug responsive to the estimated biasing force. In a first example of the system, the controller additionally includes instructions stored in non-transitory memory for adjusting the estimated biasing force responsive to an octane rating of fuel injected into the combustion chamber. A second example of the system optionally includes the first example, and further includes wherein the top wall is coupled to the base by an expandable gasket, and wherein the gasket is expandable in a direction of a central axis of the combustion chamber. A third example of the system optionally includes one or both of the first and second examples, and further includes wherein the base is fluidly sealed and gas contained within the base does not mix or converge with gas within the combustion chamber.

In another representation, a method comprises: estimating a spring constant of a gas spring formed by an interior of a piston of a combustion chamber of an engine and capped by a top outer wall of the piston; adjusting an operating parameter of the engine by a first amount responsive to the estimated spring constant being less than a threshold spring constant; and adjusting the operating parameter by a second amount responsive to the estimated spring constant being greater than the threshold spring constant, with the first amount being different than the second amount.

In yet another representation, a method comprises: estimating a temperature of a mechanical biasing member disposed within a pressure-reactive piston; estimating a biasing force of the mechanical biasing member based on the estimated temperature; and adjusting an operating parameter of the engine based on the estimated biasing force.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
   estimating a biasing force of a pressure-reactive piston disposed within a combustion chamber of an engine; and
   adjusting an operating parameter of the engine based on the estimated biasing force,
   wherein the biasing force is estimated based on at least one of an output of an engine coolant temperature sensor, an output of an engine exhaust gas temperature sensor, or an output of an engine oil temperature sensor.

2. The method of claim 1, wherein adjusting the operating parameter of the engine includes adjusting an ignition timing of the combustion chamber.

3. The method of claim 2, wherein adjusting the ignition timing includes advancing the ignition timing relative to a pre-determined standard ignition timing or retarding the ignition timing relative to the pre-determined standard ignition timing.

4. The method of claim 3, wherein advancing and retarding the ignition timing is responsive to the estimated biasing force being greater than or less than a threshold biasing force.

5. The method of claim 1, further comprising determining an engine knock amount based on an output of an engine knock sensor and adjusting the operating parameter of the engine based on the engine knock amount.

6. The method of claim 5, wherein the operating parameter of the engine is adjusted by a first amount based on the estimated biasing force, wherein the operating parameter of the engine is adjusted by a second amount based on the engine knock amount, and wherein the first amount is different than the second amount.

7. The method of claim 5, wherein the engine knock amount includes a knock intensity corresponding to an amount by which the output of the engine knock sensor exceeds a threshold output, and wherein adjusting the engine parameter reduces the knock intensity.

8. The method of claim 5, wherein the engine knock amount includes a knock rate, and wherein adjusting the engine parameter reduces the knock rate.

9. The method of claim 8, wherein the knock rate is determined over at least one complete combustion cycle of the combustion chamber.

10. The method of claim 1, wherein the combustion chamber is one of a plurality of combustion chambers, and wherein adjusting the operating parameter includes adjusting an ignition timing of each combustion chamber of the plurality of combustion chambers.

11. A method comprising:
    estimating a biasing force of a pressure-reactive piston disposed within a combustion chamber of an engine; and
    adjusting an ignition timing of the combustion chamber based on the estimated biasing force and an octane rating of fuel injected into the combustion chamber,
    wherein estimating the biasing force includes measuring an output of at least one engine temperature sensor to estimate a temperature of gas sealed within the pressure-reactive piston.

12. The method of claim 11, wherein estimating the biasing force includes calculating a pressure of the gas sealed within the pressure-reactive piston based on the temperature of the gas.

13. The method of claim 11, wherein adjusting the ignition timing includes advancing or retarding the ignition timing by a first amount relative to a pre-determined standard ignition timing based on the estimated biasing force and advancing or retarding the ignition timing by a second amount relative to the pre-determined standard ignition timing based on the octane rating of the fuel injected into the combustion chamber with the first amount being different than the second amount.

14. The method of claim 13, further comprising adjusting the ignition timing of the combustion chamber by a third amount relative to the pre-determined standard ignition timing based on both of the estimated biasing force and the octane rating of the fuel injected into the combustion chamber, with the third amount being different than the first amount and the second amount.

15. A system comprising:
    an engine including a combustion chamber and a spark plug disposed therein;
    a pressure-reactive piston disposed within the combustion chamber, the pressure-reactive piston including a top wall movable relative to a base of the pressure-reactive piston and positioned away from the base, the top wall biased away from the base by gas contained within the base; and a controller including computer-readable instructions stored in non-transitory memory for estimating a biasing force of the gas against the top wall and adjusting an electrical discharge timing of the spark plug responsive to the estimated biasing force.

16. The system of claim 15, wherein the controller additionally includes instructions stored in non-transitory memory for adjusting the estimated biasing force responsive to an octane rating of fuel injected into the combustion chamber.

17. The system of claim 15, wherein the top wall is coupled to the base by an expandable gasket, wherein the gasket is expandable in a direction of a central axis of the combustion chamber, and wherein the base is fluidly sealed and gas contained within the base does not mix or converge with gas within the combustion chamber or gases within a crank case.

* * * * *